Sept. 5, 1933.　　　　L. U. EYERLY　　　　1,925,180
ORIENTATOR
Filed Sept. 16, 1931　　　2 Sheets-Sheet 1
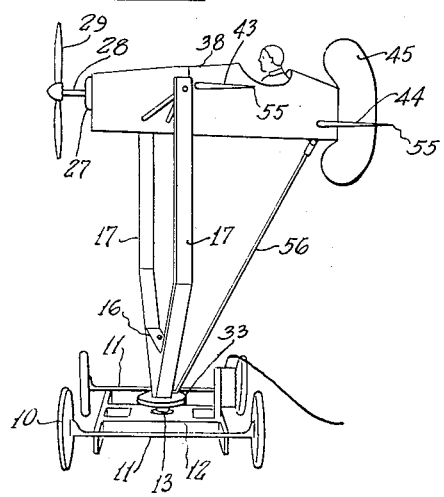
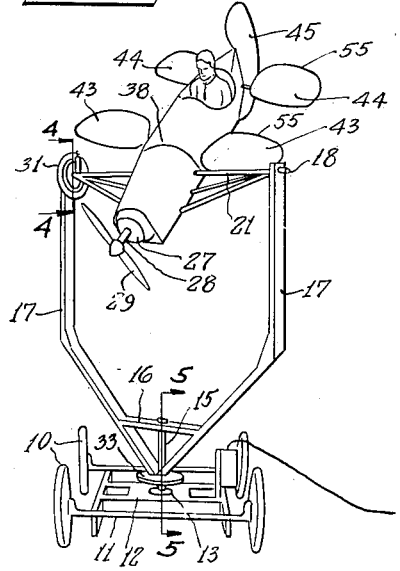
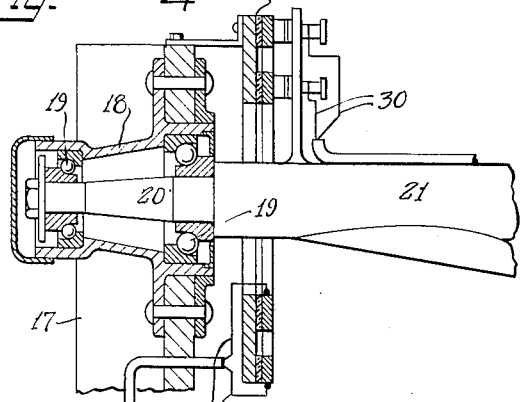
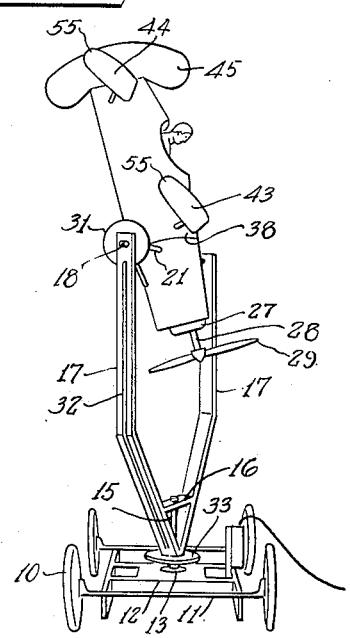
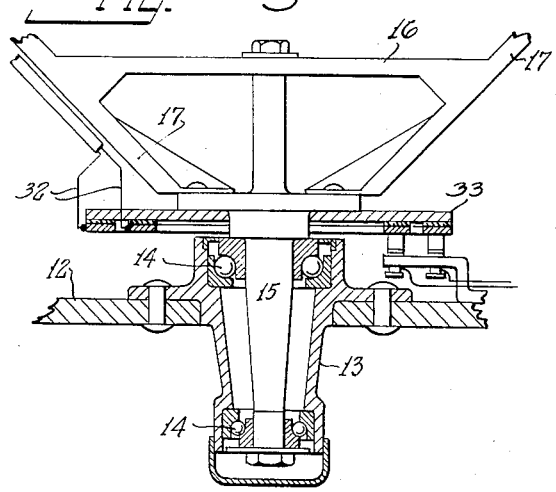
INVENTOR
L. U. EYERLY
BY E. B. Birkenbuel
ATTORNEY Sept. 5, 1933.  L. U. EYERLY  1,925,180
ORIENTATOR
Filed Sept. 16, 1931   2 Sheets-Sheet 2
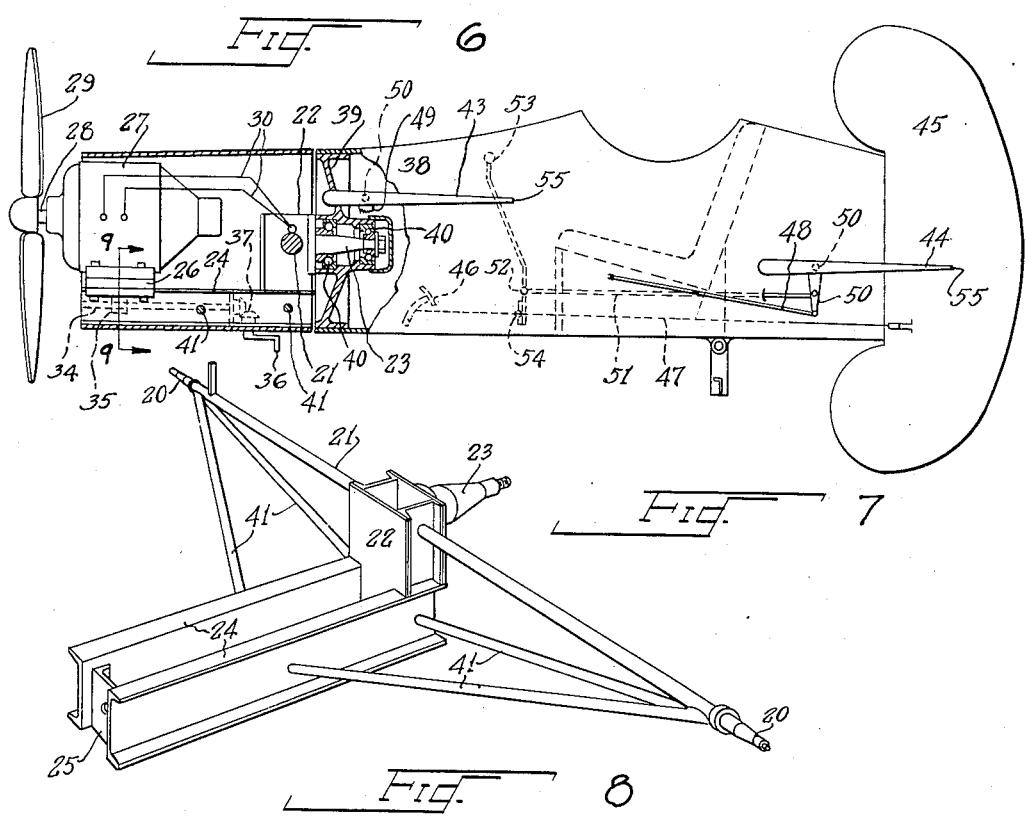
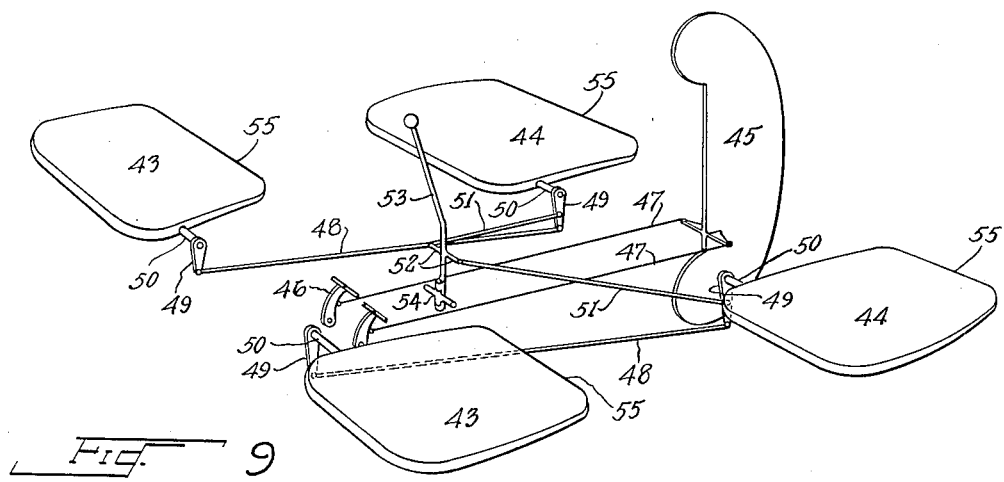
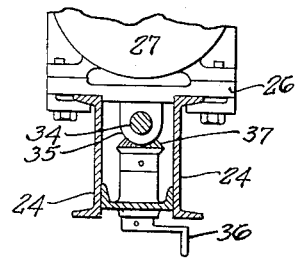
INVENTOR
L. U. EYERLY
ATTORNEY Patented Sept. 5, 1933

1,925,180

UNITED STATES PATENT OFFICE 1,925,180

ORIENTATOR

Lee U. Eyerly, Salem, Oreg.

Application September 16, 1931
Serial No. 563,132

2 Claims. (Cl. 35—12)

This invention relates generally to aeronautics, and particularly to a new form of orientator.

The main object of this invention is to provide a new form of orientator adapted to facilitate instruction work in aeronautics.

The second object is to provide a highly entertaining form of amusement device whereby the user may experience all the thrills of flying without undergoing the dangers usually accompanying such experience.

The third object is to provide a new form of fuselage for use in conjunction with devices of this character, whereby the cockpit of the fuselage may rotate with relation to the engine compartment.

These, and other objects, will become more apparent from the specification following as illustrated in the accompanying drawings; in which:

Fig. 1 is a side elevation of the device.

Fig. 2 is a perspective front elevation showing it being "nosed down".

Fig. 3 is a view similar to Fig. 2 showing the execution of an outside loop.

Fig. 4 is a section taken along the line 4—4 in Fig. 2.

Fig. 5 is a section taken along the line 5—5 in Fig. 2.

Fig. 6 is a side elevation of the fuselage with the engine compartment and the foreportion of the cockpit broken away in section.

Fig. 7 is a perspective view of the motor mounting.

Fig. 8 is a perspective view of the controls.

Fig. 9 is a vertical section taken along the line 9—9 in Fig. 6.

Similar numbers of reference refer to similar parts throughout the several views.

Referring in detail to the drawings, there is shown a vehicle consisting of a set of wheels 10 which are mounted on the axles 11 upon which is supported a platform 12. Mounted in the center of the platform 12 is mounted an upright housing 13 in which are disposed the bearings 14 which support the vertical spindle 15 on whose upper end is secured a base 16 from whose ends project upwardly the standards 17. At the upper end of each standard 17 is mounted a horizontal housing 18 into which are contained the bearings 19. Journaling in the bearings 19 are the spindles 20 of the horizontal axle 21 whose midportion passes through an upright structural column 22. It will be understood that the word "upright" as used herein, as well as other relative terms which describe parts whose positions vary with the operation of the device, allude to these parts when the fuselage is in a horizontal position, as shown in Fig. 1. On the rearward side of the column 22 is rigidly secured a spindle 23 which is normal to the axle 21. Below the axle 21 and secured to the column 22 parallel with the axis of the spindle 23 are the guide rails 24 which are held in spaced relation at their forward ends by a tie plate 25. Mounted on the rails 24 is a slidable motor base 26 on which is mounted a motor 27 on whose shaft 28 is secured the propeller 29. Power is supplied to the motor 27 through the leads 30 by way of the commutator ring 31 from which the lead wires 32 connect with the second commutator ring 33 on the under side of the base 16.

The motor 27 is moved along the rails 24 by means of a screw 34 which passes through a nut 35 on the under side of the motor base 26. Rotation is imparted to the screw 34 by the crank 36 through a pair of bevel gears 37. The purpose of the slidable adjustment for the motor 27 is for balancing the fuselage.

The cockpit of the device may follow closely the lines of an ordinary fuselage and differs therefrom only in having its forward end 38 rigidly attached to a wheel-shaped end 39 within which are placed the bearings 40 which in turn receive the spindle 23. It is desirable to provide braces 41 between the rails 24 and the outer ends of the horizontal axle 21.

It will be understood that that portion of the fuselage behind the member 39 is rotatable on a longitudinal axis, while the engine compartment 42 is rotatable on a horizontal axis which coincides with the axis of the shaft 21, and that the entire device above the base 16 rotates on the vertical axis of the spindle 15.

The portion of the fuselage behind the member 39 is provided with the conventional form of ailerons 43 and elevators 44 as well as a rudder 45. The rudder 45 is operated by the foot pedals 46 operated through the usual cables 47. The elevators 44 and ailerons 43 do not function in the manner usual in modern airplane controls, it being necessary that all these elements operate in unison when nosing up or down or in a reverse direction on opposite sides of the fuselage when desiring to rotate same on the axis of the spindle 23. Obviously, the ailerons and elevators on the same side of the fuselage must operate in unison at all times. This is made necessary by the fact that they are coupled by means of the rod 48 which joins the levers 49 on the shafts 50 on which the members 43 and 44 are pivoted. Motion is imparted to the levers 49 by means of the pull rods 51 which converge toward the cross member 52 on the control lever 53. The lever 53 is mounted in a manner to permit it to swing laterally as well as fore and aft on the cross-shaped rocking support 54 which is suitably mounted within the cockpit.

The operation of the control lever 53 is as follows: If it is moved directly forwardly, it will depress the trailing edges 55 of the members 43 and 44, and the reaction of the air currents from the propeller 29 will cause a lifting action on the tail end of the device, causing it to nose down. A reverse direction will, of course, cause it to nose up. If, however, the lever 53 is moved laterally, then owing to the converging relationship between the rods 51, the members 43 and 44 on one side of the fuselage will be tipped up and those on the other side tipped down, thereby causing the cockpit portion of the fuselage to rotate on its longitudinal axis. It can be seen that either of these actions combined with the action of the rudder 45 can be made to cause a great variety of movements on the part of the occupant and his immediate surroundings. In order to facilitate the entrance and exit of the occupant it is desirable to provide a removable brace 56 which may be inserted between the base 16 and the under side of the tail end of the fuselage when the machine is not in use.

I claim:

1. An orientator having in combination a standard capable of rotation on a vertical axis, a propeller unit mounted on said standard capable of rotation on a horizontal axis normal to the axis of the propeller, and a cockpit unit capable of rotation on an axis substantially parallel with the axis of said propeller.

2. A fuselage for orientators having a forward engine compartment provided with a transverse, horizontal axle about which said compartment may be rotated, and a cockpit section rotatably attached to said engine compartment on an axis normal to the axis of said axle.

LEE U. EYERLY.